United States Patent
Bansal et al.

(10) Patent No.: US 12,173,112 B2
(45) Date of Patent: Dec. 24, 2024

(54) EPOXY RESIN SYSTEMS

(71) Applicant: Westlake Epoxy Inc., Houston, TX (US)

(72) Inventors: Amitabh Bansal, Sugar Land, TX (US); Larry Steven Corley, Kingsport, TN (US); Diana Sepulveda-Camarena, Sugar Land, TX (US); Jennifer W. Chung, Katy, TX (US); Leeanne Taylor, Columbus, OH (US); Alla Hale, South San Francisco, CA (US)

( * ) Notice: Subject to any disclaimer, the term of this patent is extended or adjusted under 35 U.S.C. 154(b) by 0 days.

(21) Appl. No.: 17/837,435

(22) Filed: Jun. 10, 2022

(65) Prior Publication Data

US 2022/0298295 A1    Sep. 22, 2022

Related U.S. Application Data

(63) Continuation of application No. 16/126,612, filed on Sep. 10, 2018, now Pat. No. 11,359,047.

(60) Provisional application No. 62/558,182, filed on Sep. 13, 2017.

(51) Int. Cl.
| | |
|---|---|
| *C08G 59/36* | (2006.01) |
| *C08G 59/32* | (2006.01) |
| *C08G 59/40* | (2006.01) |
| *C08G 59/50* | (2006.01) |
| *C08G 59/56* | (2006.01) |
| *C08G 59/68* | (2006.01) |

(52) U.S. Cl.
CPC ......... *C08G 59/36* (2013.01); *C08G 59/3245* (2013.01); *C08G 59/4071* (2013.01); *C08G 59/5073* (2013.01); *C08G 59/56* (2013.01); *C08G 59/686* (2013.01)

(58) Field of Classification Search
CPC ............... C08G 59/36; C08G 59/3245; C08G 59/4071; C08G 59/5073; C08G 59/56; C08G 59/686
USPC ........................................................ 525/524
See application file for complete search history.

(56) References Cited

U.S. PATENT DOCUMENTS

| | | | | |
|---|---|---|---|---|
| 4,145,369 | A * | 3/1979 | Hira ..................... | C08K 3/02 525/487 |
| 2007/0219295 | A1* | 9/2007 | Levchik ............ | C08G 59/4071 523/451 |

FOREIGN PATENT DOCUMENTS

JP    2011213871 A  * 10/2011  .............. C08L 63/02

OTHER PUBLICATIONS

Sato et al., JP 2011-213871 A machine translation in English, Oct. 27, 2011. (Year: 2011).*
Daihachi, https://flame-retardants.jp/products/px-200/, accessed on Jun. 29, 2023. (Year: 2023).*

* cited by examiner

*Primary Examiner* — David T Karst

(57) ABSTRACT

Compositions and methods for forming epoxy resin systems are provided. In one embodiment, a composition is provided for an epoxy resin system including an epoxy resin blend comprising an epoxy resin, a first curing agent selected from the group of a polyarylene alkylphosphonate, a polyarylene arylphosphonate, and combinations thereof, and a second curing agent.

14 Claims, No Drawings

EPOXY RESIN SYSTEMS

RELATED APPLICATION DATA

This application is a continuation application of application U.S. application Ser. No. 16/126,612, filed Sep. 10, 2018, which application claims benefit to U.S. Provisional Application No. 62/558,182, filed Sep. 13, 2017, of which the entire contents of the applications are incorporated by reference herein.

FIELD OF THE INVENTION

The present invention relates to curing compositions for epoxy resin systems and to epoxy resins prepared utilizing the curing composition. The present invention also relates to methods of preparing epoxy resin systems and to articles made therefrom. The epoxy resin systems of the invention include a novel curing agent system.

BACKGROUND OF THE INVENTION

Epoxy resin systems are used in the manufacturing of various articles, including composites. Epoxy resins do not possess inherent flame retardant properties. Therefore, different strategies to provide this characteristic have been employed over the years. However, there are very few epoxy resin systems that both combine high process throughput (such as suitability for resin transfer molding (RTM), vacuum infusion, vacuum assisted resin transfer molding (VAR™), and filament winding (FiWi)) and also meet FAA regulations for Fire, Smoke and Toxicity (FST).

There is a need for an infusion compatible epoxy resin for aerospace applications, interiors and composites which led to this invention.

SUMMARY OF THE INVENTION

In one aspect, the invention is a composition including an epoxy resin system comprising an epoxy resin blend comprising an epoxy resin, a first curing agent selected from the group of a polyarylene alkylphosphonate, a polyarylene arylphosphonate, and combinations thereof, and a second curing agent selected from the group consisting of a compound having an imidazole group, a compound having a fused imidazole ring, an amine, and combinations thereof.

In another aspect, the invention is a composition including an epoxy resin system comprising an epoxy resin blend comprising an epoxy resin, a first curing agent selected from the group of a polyarylene alkylphosphonate, a polyarylene arylphosphonate, and combinations thereof, and a second curing agent selected from the group consisting of a compound having a fused imidazole ring, an amine, an anhydride, a mixture of a compound having an imidazole group and one or more of a compound having a fused imidazole ring, an amine, and an anhydride, and combinations thereof, wherein the epoxy resin system is free of fillers.

DETAILED DESCRIPTION OF THE INVENTION

One embodiment of the epoxy resin system of the invention includes an epoxy resin blend comprising an epoxy resin, a first curing agent selected from the group of a polyarylene alkylphosphonate, a polyarylene arylphosphonate, and combinations thereof, and a second curing agent. In one embodiment, the second curing agent may be selected from the group consisting of a compound having an imidazole group, a compound having a fused imidazole ring, an amine, and combinations thereof. In another embodiment, the second curing agent may be selected from the group consisting of a compound having a fused imidazole ring, an amine, an anhydride, a mixture of a compound having an imidazole group and one or more of a compound having a fused imidazole ring, an amine, and an anhydride, and combinations thereof. The second curing agent is not included in the epoxy resin blend. The composition may further include a diluent, an additive phosphorus compound, or combinations thereof. The epoxy resin system may be free of fillers, may be free of non-arylene alkylphosphonates, may be free of non-arylene arylphosphonates, or a combination thereof.

In one embodiment, the epoxy resin system includes from about 60 wt. % to about 99.8 wt. % of the epoxy resin blend, such as from about 70 wt. % to about 99.5 wt. % or from about 80 wt. % to about 99.8 wt. %. Alternatively, the epoxy resin system may comprise 100 parts epoxy resin blend, and 0.2 to 25.0 phr (parts per hundred resin) of the second curing agent, such as 100 parts epoxy resin blend cured with 0.5 to 10 parts second curing agent, for example, 100 parts epoxy resin blend cured with 1.0 to 8.0 parts second curing agent).

The second curing agent may comprise from about 0.2 percent by weight (wt. %) to about 40 wt. %, such as from about 0.5 wt. % to about 30 wt. % or 0.2 wt. % to about 20 wt. %, of the epoxy resin system.

It has been discovered that the epoxy resin system disclosed herein cured by itself, or in combination with a second curing agent, may have a resulting formulation that has a viscosity of less than 500 mPa-s at 100° C., and more preferentially less than 500 mPa-s at 60° C., and a char yield of greater than 40%.

The epoxy resin blend of the invention may include aromatic epoxy resins based on aromatic compounds, in particular, phenolic compounds, including bisphenol F, bisphenol A, 1,1-bis(4-hydroxyphenyl)ethane (bisphenol E), 1,1-dichloro-2,2-bis(4-hydroxyphenyl)ethene (bisphenol C), phenolic novolacs, phenolic resoles, and combinations. The epoxy resins may be polyfunctional (including bifunctional) epoxy resins. The epoxy resin component comprises from about 20 percent by weight (wt. %) to about 95 wt. %, such as from about 40 wt. % to about 90 wt. %, for example, from about 50 wt. % to about 85 wt. % of the epoxy resin blend.

Commercial examples of suitable liquid epoxy resins include, but are not limited to, EPON™ Resins 827, 828, and 862, and EPIKOTE™ Resin 158, all of which are commercially available from Hexion Inc., of Columbus, Ohio.

In another embodiment, the epoxy resin blend may contain an epoxy diluent, such as a monofunctional or multifunctional epoxy diluent as a viscosity reducer. Suitable diluents include monoglycidyl ethers of alcohols or polyglycidyl ethers of non-aromatic glycols or triols or polyols, or polyglycols, or combinations thereof. One example of a polyglycol is poly(propylene oxide) glycol. The additive may be a monofunctional epoxy additive, which may also include monoglycidyl esters.

When present in the epoxy resin blend, the optional epoxy diluent may be blended with the epoxy resin component from about 1 percent by weight (wt. %) to about 30 wt. %, such as about 5 wt. % to about 20 wt. % of the epoxy resin blend.

The epoxy resin system may include a polyarylene alkylphosphonate compound, a polyarylene arylphosphonate compound, or a combination thereof. It is believed that the polyarylene alkylphosphonate and polyarylene arylphosphonate compounds may function as curing agents for epoxy compounds.

Examples of suitable polyarylene alkylphosphonate and polyarylene arylphosphonate compounds include poly-(m-phenylene methylphosphonate), poly-(m-phenylene phenylphosphonate), and combinations thereof. An example of a preferred polyarylene alkylphosphonate is poly-(m-phenylene methylphosphonate), as shown in the following structures.

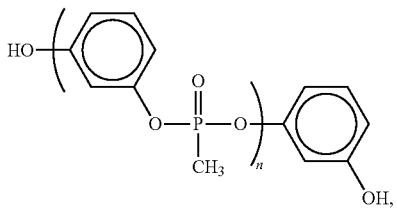

with n from 1 to 50.

The polyarylene alkylphosphonate compound, a polyarylene arylphosphonate compound, or a combination thereof, may comprise from about 5 percent by weight (wt. %) to about 80 wt. %, such as about 10 wt. % to about 60 wt. %, for example, from about 15 wt. % to about 50 wt. %, of the epoxy resin blend.

In an alternative embodiment, the epoxy resin blend may further include an additive phosphorus compound selected from the group of a non-polyarylene phosphonate, a phosphazene, an alkyl phosphate, an aryl phosphate, an alkyl phosphite, an aryl phosphite, and combinations thereof. The additive phosphorus compound may be selected from the group of dimethyl methylphosphonate, diethyl ethylphosphonate, P,P',P''',P,P',P'''-hexamethoxyphosphazene, P,P',P''', P,P',P'''-hexaphenoxyphosphazene, dimethyl phosphite, diethyl N,N-bis (2-hydroxyethyl) aminomethylphosphonate, tributyl phosphate, triphenyl phosphate, diphenyl methylphosphonate, diphenyl phenylphosphonate, resorcinol bis (diphenyl phosphate), t-butylated triphenyl phosphate, bisphenol A bis(diphenyl phosphate), bisphenol F bis(diphenyl phosphate), and combinations thereof. One preferred example is resorcinol bis(diphenyl phosphate) (RDP), as shown in the following structure.

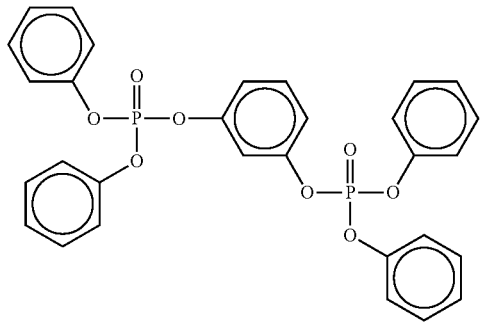

The additive phosphorus compound may comprise from about 0 percent by weight (wt. %) to about 30 wt. %, and if present, from about 0.1 wt. % to about 30 wt. % for example, from about 5 wt. % to about 20 wt. %, of the epoxy resin blend.

The total phosphorus content is preferably greater than 4 wt. % of the epoxy resin system/epoxy resin blend.

In one embodiment, the epoxy resin blend includes from about 40 wt. % to about 85 wt. % of the epoxy resin, from about 15 wt. % to about 40 wt. % of the first curing agent selected from the group of a polyarylene alkylphosphonate, a polyarylene arylphosphonate, and combinations thereof, from about 0 wt. % to about 20 wt. % of the diluent and from about 0 wt. % to about 30 wt. % of the additive phosphorus compound, with the total of all components are 100% of the epoxy resin blend.

The epoxy resin system may also include a second curing agent. The second curing agent may be a non-phosphorus containing compound. The second curing agent may be selected from the group consisting of a compound having an imidazole group, a compound having a fused imidazole ring, an amine, and combinations thereof. Alternatively, the second curing agent may be selected from the group consisting of a compound having a fused imidazole ring, an amine, an anhydride, a mixture of a compound having an imidazole group and one or more of a compound having a fused imidazole ring, an amine, and an anhydride, and combinations thereof. The amine may be a aliphatic amine or an aromatic amine. Additionally, the second curing agent may further include a thiol, a phenolic compound, or a combination thereof. The second curing agent may comprise from about 0.2 percent by weight (wt. %) to about 40 wt. %, such as about 0.5 wt. % to about 30 wt. % of the epoxy resin system.

In one embodiment, the epoxy resin system may include from about 60 wt. % to about 99.8 wt. % of the epoxy resin blend, from about 0.2 percent by weight (wt. %) to about 40 wt. % of the second curing agent, and additives, if present, may be present in an amount from about 0.2 percent by weight (wt. %) to about 30 wt. %, and the total of all components are 100% of the epoxy resin blend.

The compound having an imidazole group may be represented by the formula

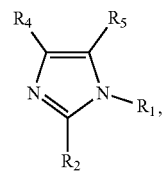

where $R_1$, $R_2$, $R_4$, and $R_5$ can each independently be a hydrogen atom, an alkyl group, or an aryl group. If $R_1$, $R_2$, $R_4$, and $R_5$, are all hydrogen atoms, then the compound is imidazole. Each alkyl group or aryl group may be substituted or unsubstituted, and may have from 1 to 12 carbon atoms, such as from 1 to 6 carbon atoms.

Examples of suitable compounds having an imidazole group are selected from the group consisting of imidazole, 1-methylimidazole, 2-methylimidazole, 2-propylimidazole, 2-ethyl-4-methylimidazole, 2-phenylimidazole, and combinations thereof.

The compound having a fused imidazole ring may be represented by the formula:

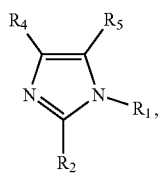

where $R_1$, $R_2$, $R_4$, and $R_5$ can each independently be a hydrogen atom, an alkyl group, or an aryl group, and at least one of the "R" combinations, such as $R_1$ and $R_2$, $R_1$ and $R_5$, or $R_4$ and $R_5$, comprise a non-aromatic ring structure or an aromatic ring structure. For example, $R_4$ and $R_5$ may be part of a monocyclic aromatic or polycyclic aromatic ring structure, such as in benzimidazole.

Examples of suitable compounds having a fused imidazole ring are selected from the group consisting of benzimidazole, toluimidazole, and combinations thereof.

Suitable amines include primary, secondary, and tertiary amines. Examples of suitable amines may be selected from the group consisting of isophoronediamine, dimethylaminoethanol, dodecyldimethylamine, N-methyldiethanolamine, m-xylylenediamine or 1,3-bis(aminomethyl) benzene, 1,3-diamino-4-methylcyclohexane, 1,3-diamino-2-methylcyclohexane, 1,3-diamino-2,6-diethyl-4-methylbenzene and 1,3-diamino-4,6-diethyl-2-methylbenzene, and combinations thereof.

Suitable anhydrides include cycloaliphatic anhydrides, aromatic anhydrides, and combinations thereof. Examples of suitable anhydrides may be selected from the group consisting of phthalic anhydride, succinic anhydride, adipic anhydride, tetrahydrophthalic anhydride, methyltetrahydrophthalic anhydride, methylhexahydrophthalic anhydride, nadic methyl anhydride, and combinations thereof.

In another embodiment, the epoxy resin system may further include one or more additives selected from the group consisting of an accelerator, a filler, a toughening agent, a viscosity modifying agent, and combinations thereof.

Alcohols, polyols or other hydroxyl compounds may be potentially used as processing aids or accelerators for an imidazole containing curing component. Amides, sulfonamides, imides or hydrazides can be also optionally used as accelerators. Examples of toughening agents used with epoxy resins include carboxyl-terminated poly(butadiene-co-acrylonitrile) rubbers, polyurethane rubbers, amine-terminated rubbers, thermoplastics, and combinations thereof. Examples of viscosity (rheology) modifying agents could include monoepoxy and some polyepoxy diluents of the HELOXY™ series (from Hexion Inc., of Columbus, Ohio), fumed silica, delaminated clays treated with quaternary ammonium compounds, anionic polymers, and combinations thereof. Fillers (or filler material) may be organic or inorganic materials. Fillers (or filler material) may be materials selected from such known fillers as talc, silica, alumina, aluminum hydroxide, magnesium hydroxide, zinc borate, and the like. A preferred material for use herein is alumina trihydrate. Alternatively, the epoxy resin system may be free of fillers.

The additives, if present, may be present in an amount from about 0.2 percent by weight (wt. %) to about 30 wt. %, such as about 0.5 wt. % to about 15 wt. % of the epoxy resin system.

In one embodiment, the epoxy resin system can be cured at 150° C. providing a cured product having a glass transition temperature (Tg) of greater than 60° C. In another embodiment, the epoxy resin system can be cured with a cure cycle of less than 2 hours at 150° C., more preferably less than 1.5 hours at 150° C., and most preferably less than or equal to 30 minutes at 150° C., providing a glass transition temperature of greater than 65° C., more preferably greater than 70° C. and most preferably greater than 80° C. Alternative curing cycles include 20 hours at 25° C., 12 hours at 100° C., or 1 hour at 125° C.

In order to provide a better understanding of the present invention including representative advantages thereof, the following examples are offered. It is understood that the examples are for illustrative purposes and should not be regarded as limiting the scope of the invention to any specific materials or conditions.

The epoxy resin systems described herein may be used for the manufacturing of composites. Composites may be formed by applying a curable epoxy resin composition to a substrate or a reinforcing material, such as by impregnating, infusing, molding, or coating the substrate or reinforcing material, and curing the curable composition. Curing of the curable compositions disclosed herein may require a temperature of up to about 250° C., such as at a temperature from about 30° C. to about 120° C., for example, about 70° C., for periods of seconds up to hours, depending on the epoxy resin system components. The above described epoxy resin systems may be in the form of a powder, a slurry, or a liquid. After a curable epoxy resin system has been produced, as described above, it may be disposed on, in, or between the described substrates, before or during cure of the curable composition.

In one embodiment, a composite may be made by an infusion process of providing a reinforcing fiber substrate, mixing an epoxy resin system from a composition comprising an epoxy resin component and a curing agent component plus optional filler and release agent as described herein, and contacting the reinforcing fiber substrate with the epoxy resin system.

The reinforcing fiber substrate may comprise fibers and or fabrics of organic materials, such as polymeric materials, inorganic materials, such as glass, ceramics, metal-containing fibers, or combinations thereof, and combinations of organic or inorganic materials. The fibers may include aramid, polybenzimidazole, carbon/graphite, boron, quartz, aluminum oxide; glass, such as E-glass (electrical glass), S-glass, S-2 GLASS® material, C-glass, or basalt glass; silicon carbide or silicon carbide fibers containing titanium, and combinations thereof. The fibers may have a random orientation, or be unidirectional fibers or +/−45° direction fibers, such as unidirectional or +/−45° direction E-glass fibers. Examples of commercially available fibers may include organic fibers, such as KEVLAR™, aluminum oxide-containing fibers, such as NEXTEL™ fibers from 3M, silicon carbide fibers, such as NICALON™ from Nippon Carbon, and silicon carbide fibers containing titanium, such as TYRANNO™ from Ube.

The fabrics may be made of woven or non-woven fibers as described herein. The fabrics may be composed of fibers having multiple directions including 0°, 0°/90°, +/−45° direction fibers, random orientations, or other orientations. The fabrics may be of two or more layers of fibers.

The substrate may be a monolayer or a multi-layer material structure. For example, the substrate may be a composite of two alloys, a multi-layered polymeric article, and a metal-coated polymer, among others, for example. In other various embodiments, one or more layers of the curable composition may be disposed on a substrate.

The epoxy resin systems described herein may be used for fiber reinforced substrates described herein. In one embodiment, the fiber reinforced substrates comprise high strength filaments or fibers of carbon (graphite), glass, boron, and the like. Composites may contain up to about 75 vol. %, such as from about 55 wt. % to about 65 wt. %, of these fibers based on the total volume (vol %) of the composite. For example, the fibers of the composite may comprise about 60 vol % continuous uni-directional E-glass fibers or comprise up to about 65 vol % continuous+/−45° direction E-glass fibers.

EXAMPLES

Epoxy resin systems described herein were formed by providing an epoxy resin system to a mixing device and providing a second curing agent component to the mixing device.

Castings were made by curing the resin between 2 glass plates at 150° C. for 1 to 2 hours.

Laminates were made using VAR™ or Vacuum bagging using 8H Satin weave glass cloth (2, 3 or 4 plies were used). After vacuum infusion between 50 and 80° C., the temperature was ramped to 150° C. and held for 30 minutes to 1.5 hours.

Sandwich panels were made using Vacuum bagging a 2 ply-Foam Core— 2 ply configuration using a 8H satin weave glass cloth and a FAR 25.853 compliant foam. After vacuum infusion between 50 and 80° C., the temperature was ramped to 150° C. and held for 30 minutes to 1.5 hours.

Vertical burn tests were performed using laminates or ¼" (6.4 mm) thick castings per FAR 25.853 App F, Part I(a)(1)(i).

Smoke density tests were performed on laminates and sandwich panels per FAR 25.853, Appendix F, Part V.

Smoke toxicity tests were performed on laminates and sandwich panels per BSS 7239-88.

Heat release tests were performed on laminates and sandwich panels per FAR 25.853, Appendix F, Part V.

Liquid epoxy resin A is a bisphenol F (bisphenol of formaldehyde) diglycidyl ether with an epoxy equivalent weight of 165-173 and a 25° C. viscosity of 2.5-4.5 Pa-s.

Liquid epoxy resin B is a bisphenol A diglycidyl ether with an epoxy equivalent weight of 185-192 and a 25° C. viscosity of 11-15 Pa-s.

Liquid epoxy resin C is a bisphenol A diglycidyl ether with an epoxy equivalent weight of 179-184 and a 25° C. viscosity of 8-10 Pa-s.

Liquid epoxy resin D is a bisphenol F diglycidyl ether with an epoxy equivalent weight of 158-160 and a 25° C. viscosity of 1-1.4 Pa-s.

Liquid epoxy resin E is a bisphenol A diglycidyl ether with an epoxy equivalent weight of 172-178 and a 25° C. viscosity of 4-6 Pa-s.

Liquid epoxy resin F is the polyglycidyl ether of a phenol-formaldehyde novolac, a viscous liquid with an epoxy equivalent weight of 176-181 and a 25° C. viscosity of 31-40 Pa-s.

Liquid epoxy resin G is a grade of N,N,N',N'-tetraglycidyl-4,4'-methylenedianiline (TGMDA) with an epoxy equivalent weight of 110-120 and a 50° C. viscosity of 3-6 Pa-s.

Solid epoxy resin H is the polyglycidyl ether of a phenol-salicylaldehyde novolac with an epoxy equivalent weight of 160-180 and an 80° C. viscosity of 6-6.5 Pa-s.

Fyrol PMP is a poly-(m-phenylene methylphosphonate) commercially available from ICL Industrial Products.

Fyrolflex RDP is a resorcinol bis(diphenyl phosphate) commercially available from ICL Industrial Products, with the predominant component having the formula:

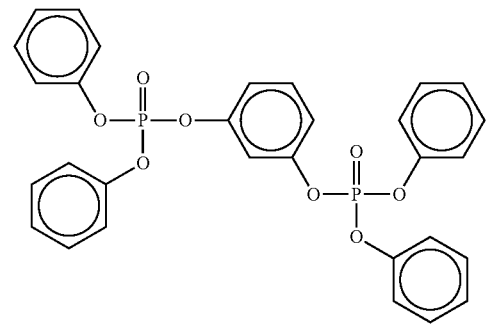

Fyrolflex BDP is a bisphenol A bis(diphenyl phosphate), commercially available from ICL Industrial Products.

ECA DEV is a liquid mixture of cycloaliphatic anhydrides commercially available from Dixie Chemical Company.

MXDA (m-xylylenediamine) refers to 1,3-bis(aminomethyl) benzene.

Baxxodur EC 210 is a cycloaliphatic diamine mixture containing primarily 1,3-diamino-4-methylcyclohexane and 1,3-diamino-2-methylcyclohexane, commercially available from BASF.

Diethyltoluenediamine (DETDA) is a trade name for an aromatic diamine mixture containing primarily 1,3-diamino-2,6-diethyl-4-methylbenzene and 1,3-diamino-4,6-diethyl-2-methylbenzene.

Example 1

Examples of testing for neat resin castings, laminates, and sandwich panels. All examples have the same configuration of 2 ply glass fabric— ½' (12.7 mm) to ¾"(19.1 mm) foam core— 2 ply glass panels; they were cured at 130-150° C. for 30 minutes to 2 hours. With regard to the data expressed in the following Table 1, processes where data was not produced is represented by the abbreviation N/A for "not available".

TABLE 1

|  | Samples: | | | | | | | | |
|---|---|---|---|---|---|---|---|---|---|
|  | 1 Control | 2 Control | 3 Control | 4 | 5 | 6 | 7 | 8 | 9 |
| Liquid epoxy resin C, wt. % | 87 | 0 | 0 | 0 | 0 | 0 | 0 | 0 | 0 |
| Liquid epoxy resin B, wt. % | 0 | 0 | 0 | 0 | 0 | 0 | 67.2 | 0 | 0 |
| Liquid epoxy resin A, wt. % | 0 | 80 | 98.5 | 67.2 | 62 | 0 | 0 | 0 | 0 |
| Liquid epoxy resin D, wt. % | 0 | 0 | 0 | 0 | 0 | 62 | 0 | 97.8 | 60 |
| Fyrol PMP, wt. % | 0 | 0 | 0 | 32.3 | 27 | 20.7 | 32.3 | 0 | 20 |
| Fyrolflex RDP, wt. % | 0 | 0 | 0 | 0 | 10 | 15.8 | 0 | 0 | 15 |

TABLE 1-continued

|  | Samples: | | | | | | | | |
|---|---|---|---|---|---|---|---|---|---|
|  | 1 Control | 2 Control | 3 Control | 4 | 5 | 6 | 7 | 8 | 9 |
| Isophorone-diamine, wt. % | 13 | 20 | 0 | 0 | 0 | 0 | 0 | 0 | 0 |
| 1-Methyl imidazole, wt. % | 0 | 0 | 1.5 | 0.5 | 1 | 0 | 0.5 | 0 | 0 |
| 2-Propyl imidazole, wt. % | 0 | 0 | 0 | 0 | 0 | 1.5 | 0 | 2.2 | 5 |
| Viscosity cP (mPa-s) of mixture at 60° C. for 0-2 hrs. | NA | NA | NA | NA | NA | 200-300 | NA | NA | 250-900 |
| 60 second Vertical burn of Casting | Fail | Fail | Not able to cure casting | Pass | Pass | Pass | Pass | Not able to cure casting | Pass |
| Laminate details | | | | | | | | | |
| # glass fabric plies in laminate | 4 | 4 | NA | 4 | 4 | 4 | NA | NA | 4 |
| Weight % resin in laminate | 35-45% | 35-45% | NA | 35-45% | 35-45% | 35-45% | NA | NA | 35-45% |
| Smoke density of laminate | Fail | Fail | NA | Pass | Pass | Pass | NA | NA | Pass |
| Smoke toxicity of laminate | NA | NA | NA | NA | NA | Pass | NA | NA | Pass |
| Sandwich panel details | | | | | | | | | |
| Weight % resin in the plies | NA | NA | NA | NA | NA | 40-50% | NA | NA | NA |
| OSU Heat release test of sandwich panels (peak heat release rate kW/m$^2$/Total heat released kW min/m$^2$) | NA | NA | NA | NA | NA | 77/62 | NA | NA | NA |

Table 1 above discloses the superiority of the invention samples Nos. 4-7 and 9 over the control composition samples 1 and 2 with respect to casting vertical burn and/or laminate smoke density performance. Also, the 60° C. viscosity and slow viscosity growth of invention compositions 6 and 9 at 60° C. render them highly suitable for resin infusion processes.

Example 2

Examples of testing for laminates made with resin mixtures containing multifunctional epoxy resins.

Laminates in this example, as in Example 1, have the configuration of 4 ply glass fabric; they were cured at 130-150° C. for 30 minutes to 2 hours. With regard to the data expressed in the following Table 2, processes where data was not produced are represented by the abbreviation N/A for "not available".

TABLE 2A

|  | Samples | | | | | |
|---|---|---|---|---|---|---|
|  | 1 Control | 2 Control | 3 Control | 4 | 10 | 11 |
| Liquid epoxy resin C, wt. % | 87 | 0 | 0 | 0 | 0 | 0 |
| Liquid epoxy resin A, wt. % | 0 | 80 | 98.5 | 67.2 | 0 | 0 |
| Liquid epoxy resin D, wt. % | 0 | 0 | 0 | 0 | 64.23 | 0 |
| Liquid epoxy resin E, wt. % | 0 | 0 | 0 | 0 | 0 | 69.17 |
| Liquid epoxy resin F, wt. % | 0 | 0 | 0 | 0 | 0 | 0 |
| Liquid epoxy resin G, wt. % | 0 | 0 | 0 | 0 | 0 | 0 |
| Solid epoxy resin H, wt. % | 0 | 0 | 0 | 0 | 0 | 0 |
| Fyrol PMP, wt. % | 0 | 0 | 0 | 32.3 | 19.76 | 29.64 |
| Fyrolflex RDP, wt. % | 0 | 0 | 0 | 0 | 14.82 | 0 |
| Isophoronediamine, wt. % | 13 | 20 | 0 | 0 | 0 | 0 |
| 1-methylimidazole, wt. % | 0 | 0 | 1.5 | 0.5 | 0 | 0 |
| 2-ethyl-4-methyl-imidazole, wt. % | 0 | 0 | 0 | 0 | 1.19 | 1.19 |
| Laminate details | | | | | | |
| # glass fabric plies in laminate | 4 | 4 | NA | 4 | 4 | 4 |
| Weight % resin in laminate | 35-45% | 35-45% | N/A | 35-45% | 35-45% | 35-45% |
| 60 second vertical burn of laminate | N/A | N/A | N/A | N/A | Pass | Pass |
| Smoke density of laminate | Fail | Fail | N/A | Pass | Pass | Pass |
| Smoke toxicity of laminate | N/A | N/A | N/A | N/A | Pass | N/A |

TABLE 2B

|  | Samples | | | | | | |
| --- | --- | --- | --- | --- | --- | --- | --- |
|  | 1 Control | 2 Control | 3 Control | 12 | 13 (a) | 14 (b) | 15 |
| Liquid epoxy resin C, wt. % | 87 | 0 | 0 | 0 | 0 | 0 | 0 |
| Liquid epoxy resin A, wt. % | 0 | 80 | 98.5 | 0 | 0 | 0 | 0 |
| Liquid epoxy resin D, wt. % | 0 | 0 | 0 | 48.42 | 55.34 | 0 | 55.34 |
| Liquid epoxy resin E, wt. % | 0 | 0 | 0 | 0 | 0 | 0 | 0 |
| Liquid epoxy resin F, wt. % | 0 | 0 | 0 | 20.75 | 0 | 0 | 0 |
| Liquid epoxy resin G, wt. % | 0 | 0 | 0 | 0 | 13.83 | 69.17 | 0 |
| Solid epoxy resin H, wt. % | 0 | 0 | 0 | 0 | 0 | 0 | 13.83 |
| Fyrol PMP, wt. % | 0 | 0 | 0 | 29.64 | 29.64 | 19.76 | 29.64 |
| Fyrolflex RDP, wt. % | 0 | 0 | 0 | 0 | 0 | 9.88 | 0 |
| Isophoronediamine, wt. % | 13 | 20 | 0 | 0 | 0 | 0 | 0 |
| 1-methylimidazole, wt. % | 0 | 0 | 1.5 | 0 | 0 | 0 | 0 |
| 2-ethyl-4-methyl-imidazole, wt. % | 0 | 0 | 0 | 1.19 | 1.19 | 1.19 | 0 |
| Laminate details |  |  |  |  |  |  |  |
| # glass fabric plies in laminate | 4 | 4 | NA | 4 | 4 | 4 | 4 |
| Weight % resin in laminate | 35-45% | 35-45% | N/A | 35-45% | 35-45% | 35-45% | 35-45% |
| 60 second vertical burn of laminate | N/A | N/A | N/A | Pass | Pass | N/A | Pass |
| Smoke density of laminate | Fail | Fail | N/A | Pass | Pass | Pass | Pass |
| Smoke toxicity of laminate | N/A | N/A | N/A | N/A | N/A | Pass | N/A |

For the above Tables 2A and 2B, N/A is represented for data not available or not generated, (a) is a Cure cycle 1 hour at 150° C. and 0.5 hours at 180° C., and (b) is a Cure cycle 1 hour at 175° C. and 1 hour at 180° C.

The data in Tables 2A and 2B show the production of successfully flame-retardant samples (#12-15) from mixtures containing multifunctional epoxy resins by the invention process.

Example 3

Examples of testing for laminates made with resin mixtures containing cycloaliphatic anhydrides.

Laminates in this example were prepared similarly to those in Example 1. With regard to the data expressed in the following Table 3, processes where data was not produced are represented by the abbreviation N/A for "not available".

TABLE 3

|  | Samples | | | |
| --- | --- | --- | --- | --- |
|  | 16 | 17 | 18 | 19 |
| Liquid epoxy resin A, wt. % | 37.5 | 44.5 | 40 | 40 |
| Fyrol PMP, wt. % | 15.6 | 18.5 | 16.7 | 16.7 |
| Fyrolflex RDP, wt. % | 9.4 | 11.1 | 10 | 10 |
| ECA DEV, wt. % | 37.5 | 22.2 | 30 | 20 |
| 2-propylimidazole, wt. % | 0 | 3.7 | 3.3 | 3.3 |
| 4000 MW poly(propylene oxide) glycol, wt. % | 0 | 0 | 0 | 10 |
| Laminate details |  |  |  |  |
| # glass fabric plies in laminate | 4 | 4 | 4 | 4 |
| Cure cycle | 1 hr@150° C. | 1 hr@150° C. | 1 hr@150° C. | 1 hr@150° C. 0.5 hr@180° C. |
| Weight % resin in laminate | 35-45% | 35-45% | 35-45% | 35-45% |
| 60 second vertical burn of laminate | Pass | Pass | Pass | Near pass |
| Smoke density of laminate | Pass | Pass | Pass | Pass |
| Smoke toxicity of laminate | NA | NA | NA | NA |

The data in Table 3 show the production of successfully flame-retardant composition samples (#16-19) from mixtures cured with anhydrides by the invention process.

Example 4

Examples of testing for laminates made with resin mixtures cured with aliphatic amines.

Laminates in this example, as in Example 1, have the configuration of 4 ply glass fabric; they were cured at 150° C. for 30 minutes. With regard to the data expressed in the following Table 4, processes where data was not produced are represented by the abbreviation N/A for "not available".

TABLE 4

| | Samples | | | | | |
|---|---|---|---|---|---|---|
| | 20 | 21 | 22 | 23 | 24 | 25 |
| Liquid epoxy resin A, wt. % | 53.4 | 53.4 | 53.4 | 53.4 | 53.2 | 50.9 |
| Fyrol PMP, wt. % | 22.3 | 22.3 | 22.3 | 22.3 | 22.2 | 21.2 |
| Fyrolflex RDP, wt. % | 13.4 | 13.4 | 13.4 | 13.4 | 13.3 | 12.7 |
| m-Xylylenediamine (MXDA), wt. % | 10.9 | 10.9 | 10.9 | 0 | 4.6 | 2.3 |
| BASF Baxxodur EC 210, wt. % | 0 | 0 | 0 | 10.9 | 4.6 | 0 |
| DETDA, wt. % | 0 | 0 | 0 | 0 | 2.1 | 0 |
| Isophoronediamine, wt. % | 0 | 0 | 0 | 0 | 0 | 9.1 |
| 230-240 mol. wt. poly(propylene oxide) diamine, wt. % | 0 | 0 | 0 | 0 | 0 | 3.8 |
| Laminate details | | | | | | |
| # glass fabric plies in laminate | 4 | 4 | 4 | 4 | 4 | 4 |
| Weight % resin in laminate | 40.9% | 37.0% | 34.5% | 35-45% | 35-45% | 35-45% |
| 60 second vertical burn of laminate | Near pass | Near pass | Near pass | Pass | Pass | Pass |
| Smoke density of laminate | Pass | Pass | NA | Pass | Pass | Pass |
| Smoke toxicity of laminate | NA | NA | NA | NA | NA | NA |

The data in Table 4 show the production of successfully flame-retardant composition samples (#20-22) from mixtures cured with aliphatic amines by the invention process.

While the present invention has been described and illustrated by reference to particular embodiments, those of ordinary skill in the art will appreciate that the invention lends itself to variations not necessarily illustrated herein.

What is claimed is:

1. An epoxy resin system, comprising:
   an epoxy resin blend comprising:
   a liquid epoxy resin based on bisphenol F; and
   a first curing agent comprising a polyarylene alkylphosphonate, and
   an aryl phosphate; and
   a second curing agent selected from the group consisting of a compound having an imidazole group, a compound having a fused imidazole ring, an amine and combinations thereof,
   wherein the epoxy resin system comprises a viscosity of 900 mPa-s or less at 60° C.

2. The epoxy resin system of claim 1, wherein the liquid epoxy resin component further comprises a monofunctional epoxy additive.

3. The epoxy resin system of claim 1, wherein the polyarylene alkylphosphonate is selected from the group of poly-(m-phenylene methylphosphonate), poly-(m-phenylene phenylphosphonate), and combinations thereof.

4. The epoxy resin system of claim 1, wherein the aryl phosphate is selected from the group of triphenyl phosphate, diphenyl methylphosphonate, diphenyl phenylphosphonate, resorcinol bis(diphenyl phosphate), t-butylated triphenyl phosphate, bisphenol A bis(diphenyl phosphate), bisphenol F bis(diphenyl phosphate), and combinations thereof.

5. The epoxy resin system of claim 1, wherein the total phosphorus content is greater than 4 wt. % of the epoxy resin system/epoxy resin blend.

6. The epoxy resin system of claim 1, wherein the epoxy resin blend further comprises a diluent.

7. The epoxy resin system of claim 6, wherein the diluent is selected from the group consisting of monoglycidyl ethers of alcohols, polyglycidyl ethers of non-aromatic glycols or triols or polyols, polyglycols, glycidyl esters, and combinations thereof.

8. The epoxy resin system of claim 1, wherein the compound having an imidazole group is selected from the group consisting of imidazole, 1-methylimidazole, 2-methylimidazole, 2-propylimidazole, 2-ethyl-4-methylimidazole, 2-phenylimidazole, and combinations thereof.

9. The epoxy resin system of claim 1, wherein the compound having a fused imidazole ring is selected from the group consisting of benzimidazole, toluimidazole, and combinations thereof.

10. The epoxy resin system of claim 1, wherein the epoxy resin blend comprises:
    from about 40 wt. % to about 85 wt. % of the liquid epoxy resin based on bisphenol F; and
    from about 15 wt. % to about 60 wt. % of the first curing agent; and
    from 0.1 wt. % to 30 wt. % of the aryl phosphate, with the total of all components are 100% of the epoxy resin blend.

11. The epoxy resin system of claim 1, wherein the epoxy resin system comprises:
    from about 60 wt. % to about 99.8 wt. % of the epoxy resin blend; and
    from about 0.2 wt. % to about 40 wt. % of the second curing agent.

12. The epoxy resin system of claim 1, wherein the epoxy resin system is free of fillers.

13. The epoxy resin system of claim 1, comprising:
    an epoxy resin blend comprising:
    a liquid epoxy resin based on bisphenol F; and
    a first curing agent comprising a polyarylene alkylphosphonate, and
    the aryl phosphate; and
    a second curing agent comprising a compound having an imidazole group.

14. The epoxy resin system of claim 1, further comprising an anhydride, an amine, or a combination thereof.

* * * * *